United States Patent
Lukic et al.

(10) Patent No.: US 8,863,396 B2
(45) Date of Patent: Oct. 21, 2014

(54) ROTARY LASER DEVICE AND METHOD FOR CONTROLLING A LASER BEAM

(75) Inventors: Sasha Lukic, Buchs (CH); Andreas Winter, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 282 days.

(21) Appl. No.: 13/300,329

(22) Filed: Nov. 18, 2011

(65) Prior Publication Data

US 2012/0127553 A1 May 24, 2012

(30) Foreign Application Priority Data

Nov. 22, 2010 (DE) .......................... 10 2010 061 726

(51) Int. Cl.
*G01C 1/00* (2006.01)
*G01C 15/00* (2006.01)

(52) U.S. Cl.
CPC ............... *G01C 15/004* (2013.01); *Y10S 33/21* (2013.01)
USPC .......................... 33/281; 33/1 PT; 33/DIG. 21

(58) Field of Classification Search
CPC ................................ G01C 1/02; G01C 15/004
USPC ........... 33/1 PT, 281, 282, 283, 284, 285, 534
See application file for complete search history.

(56) References Cited

U.S. PATENT DOCUMENTS

| | | | |
|---|---|---|---|
| 5,402,223 A | 3/1995 | Schlobohm et al. | |
| 5,819,424 A * | 10/1998 | Ohtomo et al. | 33/290 |
| 6,171,018 B1 | 1/2001 | Ohtomo et al. | |
| 6,915,583 B2 * | 7/2005 | El-Katcha et al. | 33/290 |
| 7,096,591 B2 * | 8/2006 | Glantz et al. | 33/290 |
| 7,412,775 B1 * | 8/2008 | Karnick et al. | 33/324 |
| 2003/0136901 A1 | 7/2003 | Ohtomo et al. | |
| 2003/0177649 A1 * | 9/2003 | Ito et al. | 33/1 PT |
| 2005/0274879 A1 | 12/2005 | Osaragi et al. | |
| 2008/0304041 A1 | 12/2008 | Ohtomo et al. | |
| 2010/0064534 A1 | 3/2010 | Schumacher et al. | |
| 2010/0186243 A1 * | 7/2010 | Schumacher | 33/228 |
| 2012/0042529 A1 * | 2/2012 | Hayes et al. | 33/228 |
| 2013/0276315 A1 * | 10/2013 | Kahle | 33/228 |

FOREIGN PATENT DOCUMENTS

| | | |
|---|---|---|
| DE | 43 24 478 A1 | 1/1995 |
| DE | 103 01 971 A1 | 9/2003 |
| EP | 0 722 080 A1 | 7/1996 |
| EP | 2 053 353 A1 | 4/2009 |
| EP | 2 410 292 A2 | 1/2012 |

OTHER PUBLICATIONS

U.S. Appl. No. 12/536,433, "Rotary Construction Laser", filed Aug. 5, 2009, Inventor Barth Stefan, et al.
U.S. Appl. No. 12/536,441, "Rotary Construction Laser With Stepper Motor", filed Aug. 5, 2009, Inventor Sasha Lukic, et al.

(Continued)

*Primary Examiner* — G. Bradley Bennett
(74) *Attorney, Agent, or Firm* — Crowell & Moring LLP

(57) ABSTRACT

A rotary laser device and method is disclosed. The rotary laser device includes a laser device, which generates a laser beam, a rotating device, which moves the laser device at least partially around an axis of rotation at a rotation speed, and a measuring device, with which an angle of rotation of the laser device around the axis of rotation can be determined. A memory device is provided for saving at least one angular position.

14 Claims, 7 Drawing Sheets

(56) References Cited

OTHER PUBLICATIONS

U.S. Appl. No. 12/536,430, "Laser Instrument", filed Aug. 5, 2009, Inventor Barth Stefan, et al.
U.S. Appl. No. 12/770,480, "Holding Device for Fastening A Laser Instrument", filed Apr. 29, 2010, Inventor Roman Steffen.
U.S. Appl. No. 12/770,495, "Holding Device for Fastening A Laser Instrument", filed Apr. 29, 2010, Inventor Roman Steffen, et al.
U.S. Appl. No. 12/790,705, "Laser Instrument for Electro-Optical Distance Measurement", filed May 28, 2010, Inventor Torsten Gogolla, et al.
U.S. Appl. No. 12/790,693, "Laser Instrument for Electro-Optical Distance Measurement", filed May 28, 2010, Inventor Torsten Gogolla, et al.
U.S. Appl. No. 13/186,701, "Laser Instrument and Method for Adjusting the Laser Power", filed Jul. 20, 2011, Inventor Andreas Winter, et al.
U.S. Patent Application, "Rotating Laser Device Having an Inclined Laser Plane and a Method for Aligning A Rotating Laser Device", filed Nov. 18, 2011, Inventor Sasha Lukic, et al.
German Office Action dated Sep. 30, 2013 (Three pages).
European Search Report dated May 30, 2014, with Statement of Relevancy (Six pages).

* cited by examiner

ROTARY LASER DEVICE AND METHOD FOR CONTROLLING A LASER BEAM

This application claims the priority of German Patent Document No. 10 2010 061 726.1, filed Nov. 22, 2010, the disclosure of which is expressly incorporated by reference herein.

BACKGROUND AND SUMMARY OF THE INVENTION

The present invention relates to a rotary laser device. The invention also relates to a method for controlling a laser beam.

Laser instruments that generate point-shaped and/or line-shaped laser markings are known for performing leveling or marking work in interior and exterior construction. The laser markings are used to indicate reference points or reference lines on walls, ceilings and floors. A distinction is made in terms of these laser instruments between point and/or line laser instruments and rotary laser devices. Point and/or line laser instruments generate point and/or line-shaped laser markings on a target surface by beam-forming optics such as cylindrical lenses and prisms and the markings are arranged at fixed angles to one another.

Known rotary laser devices comprise a laser device, which generates a laser beam, a rotating device, which moves the laser device at least partially around an axis of rotation at a rotation speed, and a measuring device, with which an angle of rotation of the laser device around the axis of rotation can be determined. Rotary laser devices are operated in a rotation mode, a scan mode and/or a point mode. In rotation mode, the laser beam is moved at a constant rotation speed around the axis of rotation and generates a continuous laser marking on a target surface. In scan mode, the laser beam moves back and forth between a first and second end point in a limited angle range and generates a line-shaped laser marking, designated as a laser line, on a target surface. In point mode, the rotation speed of the rotating device is zero and the laser beam generates a point-shaped laser marking, designated as a laser point, on a target surface.

In scan mode of a rotary laser device, there is a deceleration and acceleration of the laser device in the region of the end points of the delineated laser line and the laser beam rests at the end points. If the laser beam meets the human eye at the end points, the portion of the laser beam that is absorbed by the eye is greater than with a rotating laser beam and the risk of injury increases. In addition, the laser line is fuzzy in the region of the end points. The fuzziness of the laser line arises from the deceleration and subsequent acceleration of the laser device. Another disadvantage of known rotary laser devices is that in point mode only one single laser point is generated and known rotary laser devices are not suitable for transmitting angles of, for example, 90° or 180° from one target surface to another target surface.

Improving a rotary laser device with regard to the disadvantages explained above would be desirable. The object of the present invention is reducing the risk of injury to the operator when creating delineated laser lines with a rotary laser device. In addition, the rotary laser device is suitable for transmitting angles from one target surface to another target surface.

According to the invention, in the case of the rotary laser device, a memory device is provided for saving at least one angular position. Saving at least one angular position offers the possibility of controlling the laser beam as a function of the angle of rotation.

A control device is preferably provided which adjusts at least one beam property of the laser beam as a function of the angle of rotation. Suitable as beam properties of the laser beam are above all the laser power and, in the case of a modulated laser beam, the optical frequency and/or the amplitude. These beam properties are especially suited to generate sharply delineated laser lines and/or laser points on a target surface.

In a preferred embodiment, the memory device is configured as a mechanical memory device and arranged in the form of at least one reference element on a master disk of the measuring device. The measuring device includes a master disk, which is connected to the rotating device for rotation therewith, a scanning device for scanning the master disk and an evaluation and control device. In this case, the master disk is connected in a fixed manner to a rotatable shaft or is connected via gearwheels or toothed belts for rotation therewith. The advantage of a firmly connected master disk is that measurement of the angle of rotation is stable with respect to outside influences, above all temperature. Interconnecting a transmission ratio allows the resolution of the angle of rotation to be increased. The advantage of a mechanical memory device is that an additional component is not required for the memory device and detecting the angular position is stable with respect to outside influences.

It is especially preferred that the reference elements are arranged in the form of reference tracks on the master disk. The reference tracks are monitored by the scanning device of the measuring device.

In an alternative preferred embodiment, the memory device is configured as an electronic memory device, wherein the memory device is connected especially preferably to an input device. The advantage of an electronic memory device over a mechanical memory device is that the laser lines are generated with an arbitrary aperture angle and any angles may be transmitted from one target surface to another target surface. In addition, an electronic memory device allows saved angular positions to be deleted and new angular positions to be saved.

A laser receiver is preferably provided, wherein the laser receiver can be connected to the rotary laser device via a communication link. Because of the combination of the rotary laser device with a laser receiver, there is an opportunity to transmit information via the laser beam to the rotary laser device.

According to the invention, in the method for controlling a laser beam at least one angular position is saved in a memory device and at least one beam property of the laser beam is adjusted as a function of the angle of rotation. Because of the possibility of controlling the laser beam, it is possible to display delineated laser lines or laser points optically by changing beam properties of the laser beam.

The laser power of the laser beam and/or, in the case of a modulated laser beam, the optical frequency and/or the amplitude are adjusted as a function of the angle of rotation. These beam properties are especially suited for generating sharply delineated laser lines and/or laser points on a target surface.

In a first preferred method variant, a first and second angular position are saved in the memory device and at least one beam property of the laser beam is changed from a first value to a second value when the first angular position is reached and is changed from the second value to the first value when the second angular position is reached. This method variant is used to generate a delineated laser line on a target surface. To this end, the laser power as a beam property is switched between zero and a constant power value. Switching the laser power between zero and the constant power value takes place very rapidly so that a precisely delineated laser line is generated between the first and second end points, which correspond to the first and second angular positions. Because the laser beam is moved at constant rotation speed, the risk of injury to the human eye is reduced as compared to a resting laser beam.

In a second preferred method variant, a first and a second angle of rotation are calculated from the at least one saved angular position, and at least one beam property of the laser beam is changed from a first value to a second value when the first angle of rotation is reached and is changed from the second value to the first value when the second angle of rotation is reached. This method variant is used to generate one or more laser points on a target surface. To this end, the laser power as a beam property is switched between zero and a constant power value. The angular position of the laser point is saved in the memory device. The evaluation and control device of the measuring device determines a first angle of rotation from the angular position, which angle of rotation is smaller than the angular position, and a second angle of rotation, which is larger than the angular position. The distance between the first and second angle of rotation is selected in such a way that the laser power of the beam source may be switched and the laser point is easily visible to the operator. Because the laser beam is moved at a constant rotation speed, the risk of injury to the human eye is reduced as compared to a resting laser beam.

The invention also relates to a method for measuring an angle with a rotary laser device according to the invention, which has an electronic memory device and is connected to a laser receiver via a communication link. The momentary angle of rotation of the laser device or of the laser beam is saved in the memory device as the angular position when the laser beam strikes a detector device of a laser receiver. In order to increase the precision of the measurement, the detector device should be designed to be as small as possible or the detector device has a special detector field.

The laser receiver is positioned at a first point and the angular position is saved as the first angular position in the memory device and the laser receiver is subsequently positioned at a second point and the angular position is saved in the memory device as the second angular position. The angle between the first and the second point is determined as the difference between the angular positions saved in the memory device. This method offers the possibility of using a rotary laser device to measure angles.

Exemplary embodiments of the invention are described in the following on the basis of the drawings. These drawings are not necessarily supposed to represent the exemplary embodiments to scale; rather, the drawings are executed in a schematic or slightly distorted form when it is useful for explanatory purposes. Reference is made to the pertinent prior art with respect to additions to the teachings directly identifiable from the drawings. It must be taken into consideration in this case that a wide range of modifications and changes related to the form and detail of an embodiment can be undertaken without deviating from the general idea of the invention. The features of the invention disclosed in the description, the drawings as well as in the claims, may be essential for the further development of the invention both individually as well as in any combination. Moreover, all combinations of at least two features disclosed in the description, the drawings and/or the claims fall within the scope of the invention. The general idea of the invention is not restricted to the exact form or detail of the preferred embodiment described and depicted in the following or restricted to a subject matter, which would be limited as compared to the subject matter claimed in the claims. In the case of any dimensioning ranges given, values within the stated limits are also meant to be disclosed as limit values, and be applicable at will and claimable. For the sake of simplicity, the same reference numbers are used in the following for identical or similar parts having an identical or similar function.

DETAILED DESCRIPTION OF THE DRAWINGS

Figure 1:
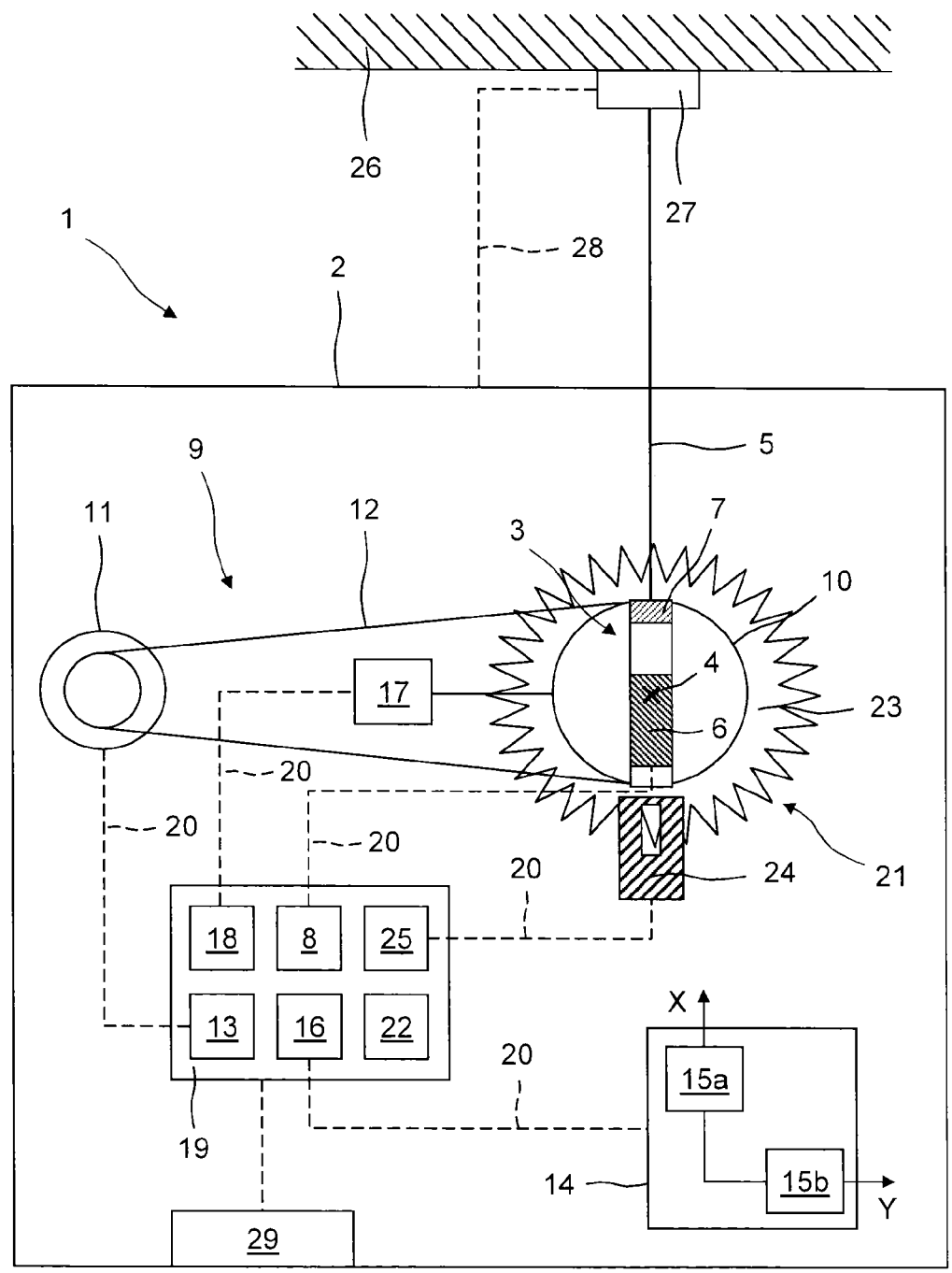
FIG. 1 illustrates a rotary laser device according to the invention with a measuring device for detecting an angle of rotation and a memory device for saving an angular position.

FIG. 1 shows a schematic representation of a laser device 1 according to the invention, which is configured as a rotary laser device. The rotary laser device 1 comprises a housing 2 and a laser device 3 arranged in the housing 2, which laser device is configured so it can rotate around an axis of rotation 4.

The laser device 3 generates a laser beam 5 and includes a beam source 6 and an optical element 7 for shaping the beam of the laser beam, which is designated as beam-shaping optics. The beam source 6 is configured as a semiconductor laser, which generates a laser beam 5 in the visible spectrum, for example a red laser beam with a wavelength of 635 nm or a green laser beam with a wavelength of 532 nm. After the laser beam 5 exits from the beam source 6, the laser beam 5 is collimated with the aid of the beam-shaping optics 7 and a parallel laser beam is generated. The beam source 6 is controlled via a first control device 8.

The laser device 3 is connected to a rotating device 9, which moves the laser device 3 around the axis of rotation 4 at a rotation speed, wherein the rotation speed may be constant but also variable. The rotating device 9 includes a rotatable shaft 10, a motor unit 11 and a transmission device 12, which is configured in the form of a toothed belt and transfers the movement of the motor unit 11 to the shaft 10. The laser device 3 is coupled to the rotatable shaft 10 and is rotatable around the axis of rotation 4. The rotating device 9 is controlled via a second control device 13.

In the embodiment in FIG. 1, the beam source 6 and the beam-shaping optics 7 are moved by the rotating device 9 around the axis of rotation 4. In an alternative embodiment, the laser device 3 also includes an optical element for deflecting the laser beam, which is designated as deflection optics. The beam source 6 generates a laser beam, which is directed at the deflection optics. The deflection optics are coupled to the shaft 10 and are moved by the rotating device 9 around the axis of rotation 4. The beam-shaping optics 7 may be arranged between the beam source 6 and the deflection optics. In addition, the beam-shaping optics 7 may be integrated into the beam source 6 or, in the case of a beam source 6 with a high beam quality and low divergence, may possibly be eliminated completely. In every case, at least one component of the laser device 3 is moved by the rotating device 9 around the axis of rotation 4.

The rotary laser device 1 has a leveling device 14, with which the laser beam, independent of an alignment of the housing 2, runs in a horizontal plane, which is aligned perpendicularly to the gravitational field of the earth. The horizontal plane is spanned by two leveling axes that are perpendicular to one another and designated as the X axis and Y axis. The leveling device 14 includes a first leveling device 15a for the X axis and a second leveling device 15b for the Y axis. The leveling devices 15a, 15b each include a sensor device and an adjusting device. The leveling device 14 is controlled via a third control device 16.

The laser plane in which the laser beam runs may be inclined with respect to the horizontal plane by an angle of inclination. To this end, the shaft 10 is configured to be adjustable by an inclination device 17 for adjusting the angle of inclination with respect to the X axis. The laser plane may alternatively be inclined with respect to the Y axis. The inclination device 17 is controlled via a fourth control device 18.

The first control device 8 for controlling the laser device 3, the second control device 13 for controlling the rotating device 9, the third control device 16 for controlling the leveling device 14 and the fourth control device 18 for controlling the inclination device 17 may be configured as separate components or be integrated into a common control unit 19, which is configured, for example, as a microcontroller. The control devices 8, 13, 16, 18 are connected via communication connections 20 with the to-be-controlled components 6, 9, 14, 17.

The rotary laser device 1 includes a measuring device 21, which detects the angle of rotation of the laser device 3 or of the laser beam 5 during rotation around the axis of rotation 4, and a memory device 22 for saving one or more angles of rotation. The measuring device 21 is made up of a master disk 23, which is connected to the shaft 10 for rotation therewith, a scanning device 24 for scanning the master disk 23 and an evaluation and control device 25. In the embodiment depicted in FIG. 1, the evaluation and control device 25 is integrated into the control unit 19; alternatively, it may be configured as a separate electronic component. The memory device 22 is arranged on the master disk 23, for example, as an electronic memory component or as mechanical memory components in the form of reference elements.

The laser beam 5 which exits from the rotary laser device 1 generates a laser marking on a target surface 26. A laser receiver 27, which is positioned on the target surface 26, is used to make the laser marking visible. The laser receiver 27 can be connected to the rotary laser device 1 via a communication link 28.

The rotary laser device 1 has an operating device 29, which is integrated into the housing 2 and can be operated externally. In addition to the operating device 29 integrated into the housing 2, a further operating device in the form of a remote control device may be provided, which can be connected to the rotary laser device 1 via a communication link. The remote control device is integrated, for example, into the laser receiver 27.

Figure 2A:
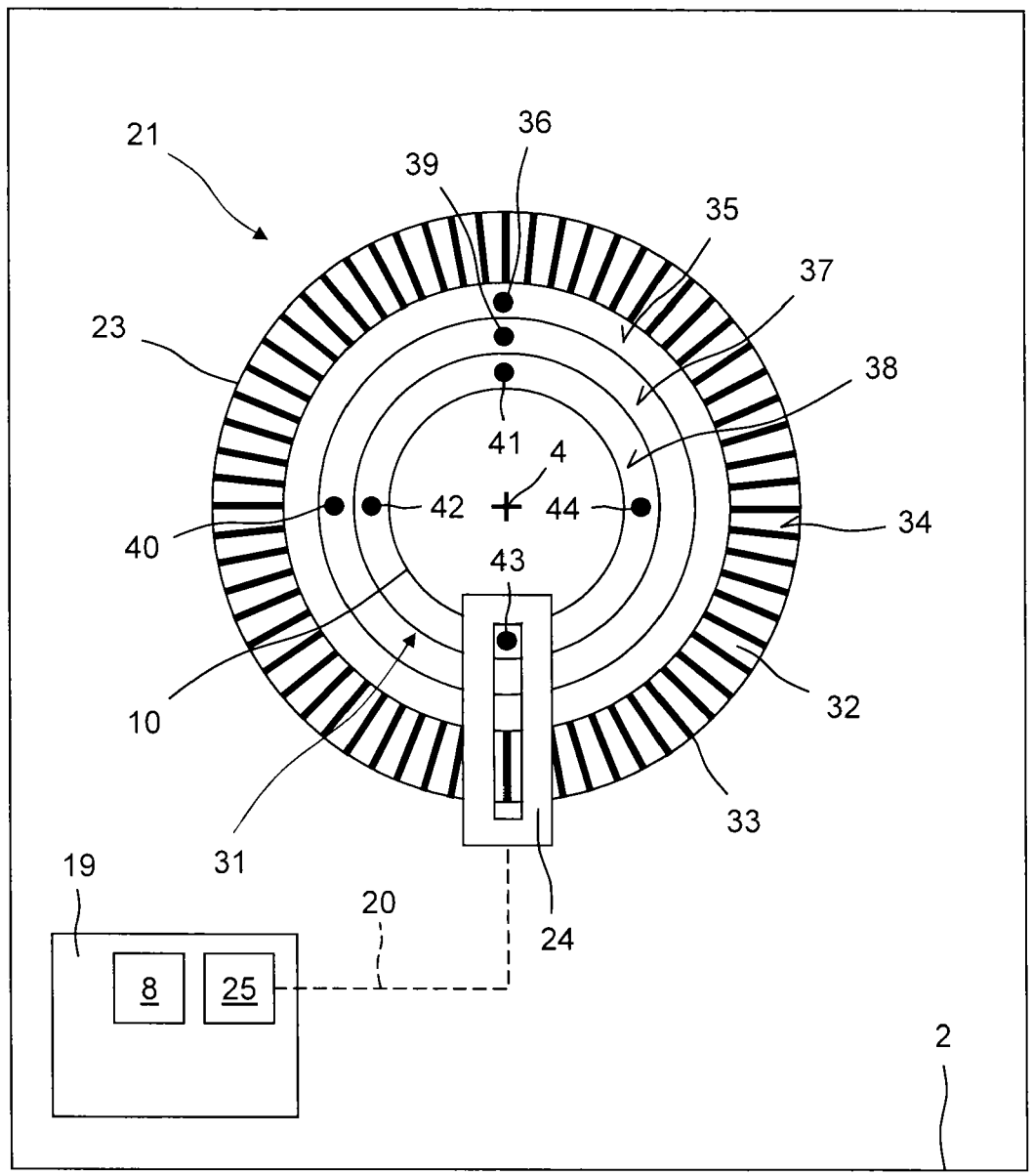
FIGS. 2A-C illustrate the measuring device from FIG. 1 and a first embodiment of the memory device, which is configured as a mechanical memory device (FIG. 2A) as well as a method according to the invention for controlling the laser power in a line mode, during which a line-shaped laser marking is generated, (FIG. 2B) and in a multipoint mode, during which several point-shaped laser markings are generated (FIG. 2C)

FIG. 2A shows the measuring device 21 for detecting the angle of rotation of the laser device 3 or of the laser beam 5 and a first embodiment of a memory device 31 for saving one or more angles of rotation, which is configured as a mechanical memory device on the master disk 23 of the measuring device 21.

The measuring device 21 is configured as an incremental rotary encoder and is based on a photo-electric measuring principle. The master disk 23 of the measuring device 21 has a plurality of segments, which are configured in an alternating manner as light strips 32 and dark strips 33. The segments 32, 33 are also designed as increments and form a so-called incremental track 34 on the master disk 23, which represents the dimensional standard of the rotary encoder. When the master disk 23 has made one complete revolution, the number of electric signals output will be equal to the number of increments on the master disk 23. The number of increments 32, 33 determines the resolution of the measuring device 21 and each increment 32, 33 corresponds to an angle unit of the master disk 23. It is not possible to subsequently change the resolution of the master disk 23.

In addition to the incremental track 34, the master disk 23 has a second track 35, in which a reference element 36 is arranged, which determines the zero position and is designated in the following as the zero element 36. The second track is also designated as the reference track 35.

The memory device 31 is integrated into the master disk 23 and is configured in the form of reference elements on the master disk 23. Along with the incremental track 34 and the reference track 35, the master disk 23 has a third track 37 and a fourth track 38, which together form the mechanical memory device 31.

The third track 37 includes a first reference element 39, which corresponds to a first angular position $\alpha_1$ of 0°, and a second reference element 40, which corresponds to a second angular position $\alpha_2$ of 90°. The first and second reference elements 39, 40 are used to generate, in a line mode of the rotary laser device 1, a delineated laser line with an aperture angle of 90° on the target surface 26.

The fourth track 38 of the master disk 23 includes a first reference element 41, which corresponds to an angular position $\beta_1$ of 0°, a second reference element 42, which corresponds to an angular position $\beta_2$ of 90°, a third reference element 43, which corresponds to an angular position $\beta_3$ of 180°, and a fourth reference element 44, which corresponds to an angular position $\beta_4$ of 270°. The angular positions $\beta_1$, $\beta_2$, $\beta_3$, $\beta_3$, $\beta_4$ can be read out of the memory device 31 by the scanning device 24 and, in a multipoint mode of the rotary laser device 1, are used to generate four laser points, which are arranged respectively at 90°.

Figure 2B:
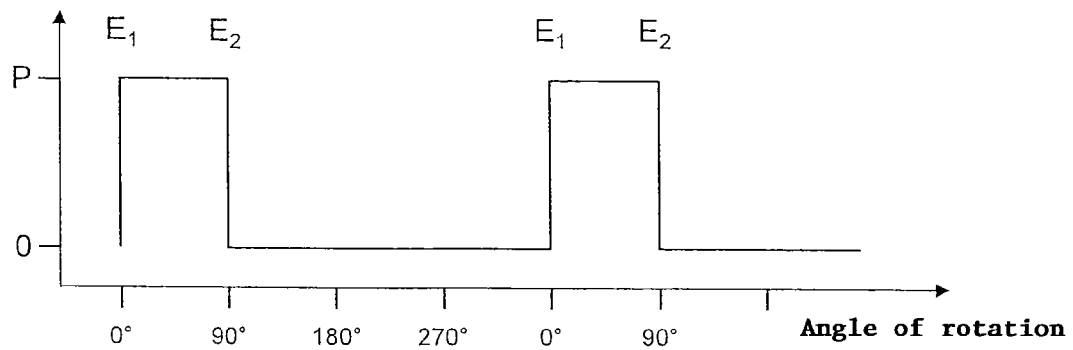

FIG. 2B shows the control of the laser power of the laser beam 5 in a line mode of the rotary laser device 1 using the example of a delineated laser line with an aperture angle of 90° between a first end point $E_1$ and a second end point $E_2$ with the aid of the first and second angular positions $\beta_1$, $\alpha_2$ saved in the memory device 31.

After the operator adjusts the line mode on the rotary laser device 1, he/she positions the resting laser beam 5 at the first end point $E_1$ of the laser line. The first end point $E_1$ corresponds to the first angular position $\alpha_1$ and the second end point E2 to the second angular position $\alpha_2$. If the master disk 23 connected to the shaft 10 for rotation therewith is rotated at a constant rotation speed around the axis of rotation 4, the first and second reference elements 39, 40 arranged in the third track 37 are detected by the scanning device 24.

The laser power of the laser beam 5 is controlled by the first control device 8 as a function of the first and second angular positions $\beta_1$, $\alpha_2$. When the first angular position $\alpha_1$ is reached, i.e., as soon as the scanning device 24 has detected the first reference element 39, the laser power of the beam source 6 is increased from zero to a constant power value P and when the second angular position $\alpha_2$ is reached, i.e., as soon as the scanning device 24 has detected the second reference element 40, the laser power is reduced from the constant power value P to zero. Switching the laser power between zero and the constant power value P via the first control device 8 occurs very rapidly so that a precisely delineated laser line is generated between the first and second end points $E_1$, $E_2$. Because the laser beam 5 moves around the axis of rotation 4 at a constant rotation speed, the risk of injury to the human eye is reduced as compared to a resting laser beam.

Figure 2C:
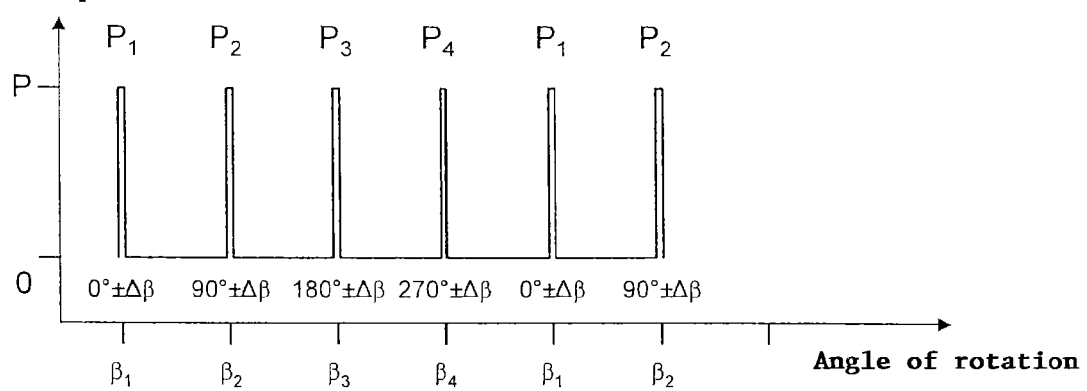

FIG. 2C shows the control of the laser power of the laser beam 5 in a multipoint mode of the rotary laser device 1 using the example of four laser points $P_1$, $P_2$, $P_3$, $P_3$, $P_4$, each of which are arranged respectively at 90°, with the aid of the angular positions $\beta_1$, $\beta_2$, $\beta_3$, $\beta_3$, $\beta_4$ saved in the memory device 31.

After the operator has adjusted the multipoint mode on the rotary laser device 1, he/she positions the resting laser beam 5 at the first laser point $P_1$. The first laser point $P_1$ corresponds to the angular position $\beta_1$, the second laser point $P_2$ to the angular position $\beta_2$, the third laser point $P_3$ to the angular position $\beta_3$ and the fourth laser point $\beta_2$ to the angular position $\beta_4$. If the master disk 23 is rotated at a constant rotation speed around the axis of rotation 4, the reference elements 41, 42, 43, 44 arranged in the fourth track 38 are detected by the scanning device 24.

The evaluation and control device 25 calculates a first angle of rotation $\beta_1-\Delta\beta$ and a second angle of rotation $\beta_1+\Delta\beta$ from the saved angular position $\beta_1$. In this case, the value AB is in the range of precision with which the laser power of the beam source 6 can be switched, and, secondly is determined in such a way that the respective laser point is easily visible to the operator. The laser power of the laser beam 5 is increased by the first control device 8 from zero to a constant power value P when the first angle of rotation $\beta_1-\Delta\beta$ is reached and reduced from the constant power value P to zero when the second angle of rotation $\beta_1+\Delta\beta$ is reached. The same applies to the other first angles of rotation $\beta_2-\Delta\beta$, $\beta_3-\Delta\beta$ and $\beta_4-\Delta\beta$ and the other second angles of rotation $\beta_2+\Delta\beta$, $\beta_3+\Delta\beta$, $\beta_4+\Delta\beta$, which the evaluation and control device 25 calculates from the saved angular positions $\beta_2$, $\beta_3$ and $\beta_4$.

With the aid of the multipoint mode, the operator of the rotary laser device 1 is able to transmit angles from one target surface to another target surface. Because the laser beam 5 rotates around the axis of rotation 4 at a constant rotation speed, the risk of injury to the human eye with the same laser power is reduced as compared to a resting laser beam.

In addition to the angular positions depicted in FIGS. 2A-C, any arbitrary angular position can be arranged as a reference element on the master disk 23 and be saved in the mechanical memory device 31. However, the angular positions that are saved on the master disk 23 as reference elements must already be determined during the manufacturing of the measuring device 21. It is not possible to subsequently change and save additional angular positions. As a result, the mechanical memory device 31 is suited above all for angular positions which are frequently required in the application. The angular positions of 90° and 180° are among these.

Figure 3A:
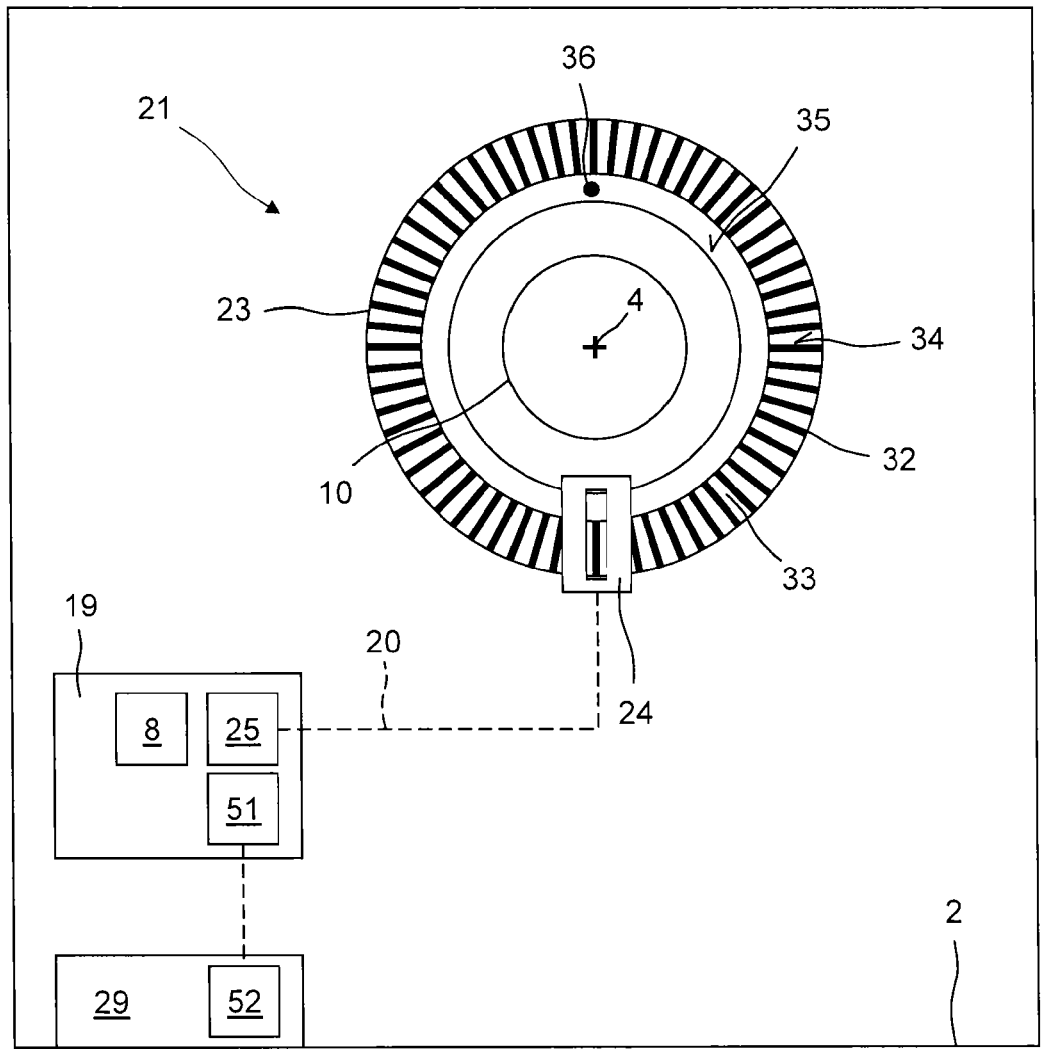
FIGS. 3A, B illustrates the measuring device from FIG. 1 and a second embodiment of the memory device, which is configured as an electronic memory device (FIG. 3A) as well as a method according to the invention for controlling the laser power in a line mode (FIG. 3B)

FIG. 3A shows the measuring device 21 for detecting the angle of rotation of the laser device 3 or the rotating laser beam 5 and a second embodiment of a memory device 51, which is configured as an electronic memory device. The electronic memory device 51 is especially suited for transmitting any angle from a target surface 26 to another target surface 26 or for generating laser lines with any aperture angle.

The memory device 51 is integrated into the control unit 19 and connected to the evaluation and control device 25 of the measuring device 21; alternatively, it may be configured as a common electronic component with the evaluation and control device 25.

The angular positions saved in the memory device 51, which are used, for example, for controlling the beam properties of the laser beam 5, are permanently saved as fixed values in the memory device 51 or are input by the operator via an input device 52 and are only saved temporarily in the memory device 51. The input device 52 is integrated into the operating device 29 of the rotary laser device 1. Alternatively or additionally, the input device 52 may be integrated into the remote control device of the laser receiver 27.

Figure 3B:
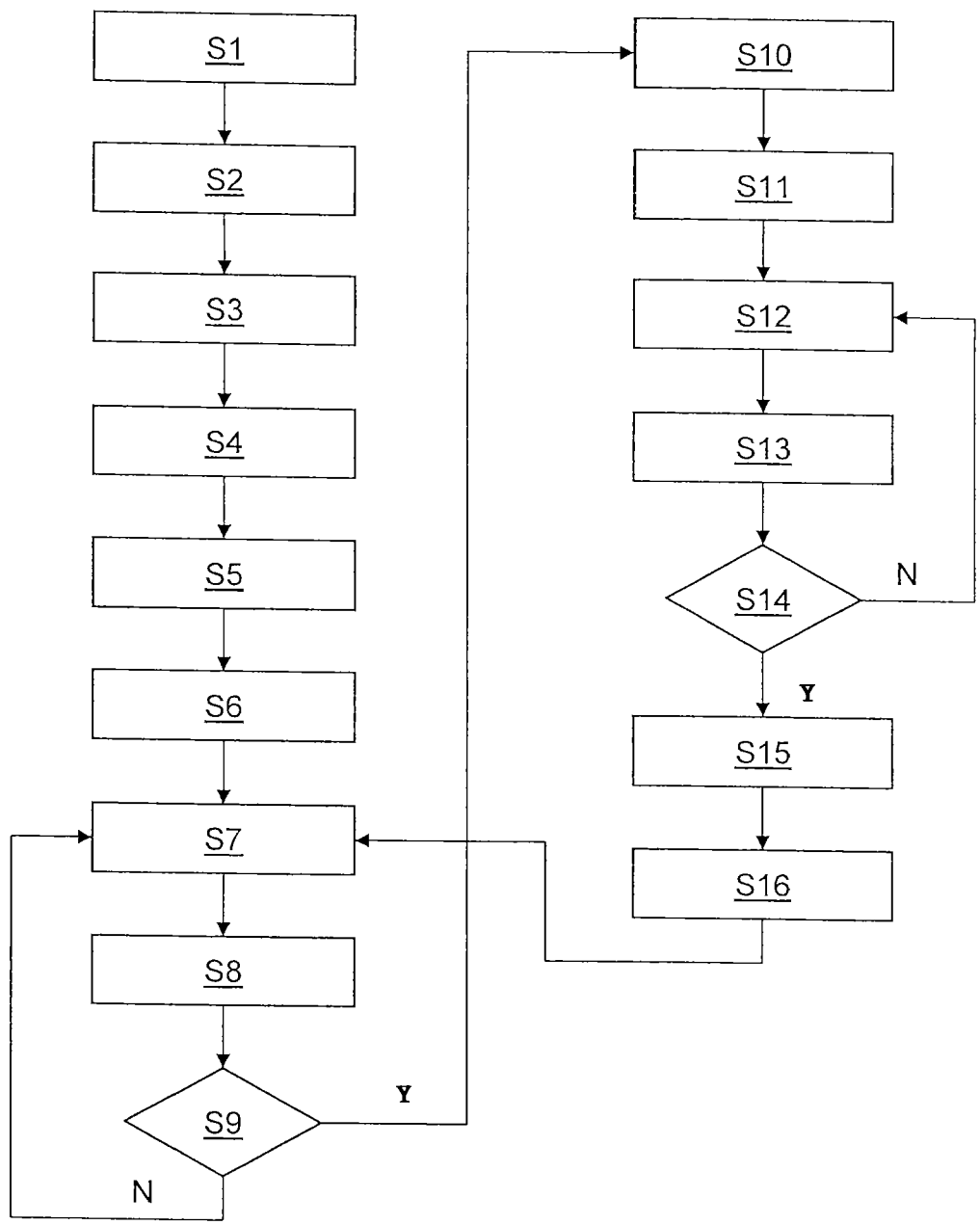

FIG. 3B depicts a method according to the invention for controlling the laser power of the laser beam 5 in line mode of the rotary laser device 1 using the example of a delineated laser line with an aperture angle between the first end point $E_1$ and the second end point $E_2$.

In a step S1, the operator selects the operating mode of the rotary laser device 1, in the present case, the line mode. In a step S2, the control device 25 queries the operator for all required parameters. Among these are, for example, the initial angle and the final angle of the delineated laser line, which correspond to end points $E_1$ and $E_2$, or alternatively the initial angle and the aperture angle of the delineated laser line. In a step S3, the operator inputs the parameters via the input device 52. In a step S4, the initial angle and the final angle of the delineated laser line are saved in the memory device 51 as the first angular position $\alpha_1$ and the second angular position $\alpha_2$.

After the preparatory steps have been concluded, in a step S5, the shaft 10 and the laser device 3 that is at least partially connected to the shaft 10 for rotational therewith is rotated 360° around the axis of rotation 4 by the rotating device 9 at a constant rotation speed. The scanning device 24 monitors the reference track 35 of the master disk 23 and in a step S6, detects the zero element 36 and transmits this information to the evaluation and control device 25 of the measuring device 21.

Detecting the angle of rotation begins at the angle of rotation 0°, which is determined by the position of the zero element 36 in the reference track 35. During the rotation of the shaft 10 at a constant rotation speed around the axis of rotation 4, the scanning device 24 monitors the increments 32, 33, which are configured as light strips 32 and dark strips 33, in the incremental track 34 of the master disk 23.

When the increments 32, 33 change from a light strip 32 to a dark strip 33 or vice versa, the scanning device 24 generates an electric signal in a step S7, which is transmitted to the evaluation and control device 25. The evaluation and control device 25 determines the momentary angle of rotation of the shaft 10 in a step S8 and compares the momentary angle of rotation in a step S9 to the first angular position $\alpha_1+n\cdot 360°$ with n=1, 2, 3, . . . . The momentary angle of rotation of the laser beam 5 is produced as the sum of the previous angle of rotation and the angle unit, which corresponds to an increment 32, 33. If the momentary angle of rotation falls short of the first angular position $\alpha_1+n\cdot 360°$ (N [no] in S9), the method continues with step S7. If the momentary angle of rotation corresponds to the first angular position $\alpha_1 + n \cdot 360°$ (Y [yes] in S9), the evaluation and control device 25 transmits this information in a step S10 to the control device 8 of the beam source 6. In a step S11, the control device 8 controls the beam properties of the laser beam 5 and increases the laser power of the beam source 6 from zero to a constant power value.

After step S11, the scanning device 24 continues to monitor the incremental track 34. When the increments 32, 33 change, the scanning device 24 generates an electrical signal in a step S12, which is transmitted to the evaluation and control device 25. The evaluation and control device 25 determines the momentary angle of rotation of the shaft 10 in a step S13 and compares the momentary angle of rotation in a step S14 to the second angular position $\alpha_2 + n \cdot 360°$ with n=1, 2, 3, . . . . If the momentary angle of rotation falls short of the second angular position $\alpha_2 + n \cdot 360°$ (N in S14), the method continues with step S12. If the momentary angle of rotation corresponds to the second angular position $\alpha_2 + n \cdot 360°$ (Y in S14), the evaluation and control device 25 transmits this information in a step S15 to the control device 8 of beam source 6. In a step S16, the control device 8 controls the beam properties of the laser beam 5 and reduces the laser power of the beam source 6 from the constant power value to zero.

After step S16, the scanning device 24 continues to monitor the incremental track 34 with step S7. The rotation of the shaft 10 around the axis of rotation 4 takes place at a constant rotation speed until the operator interrupts the rotation.

Figure 4A:
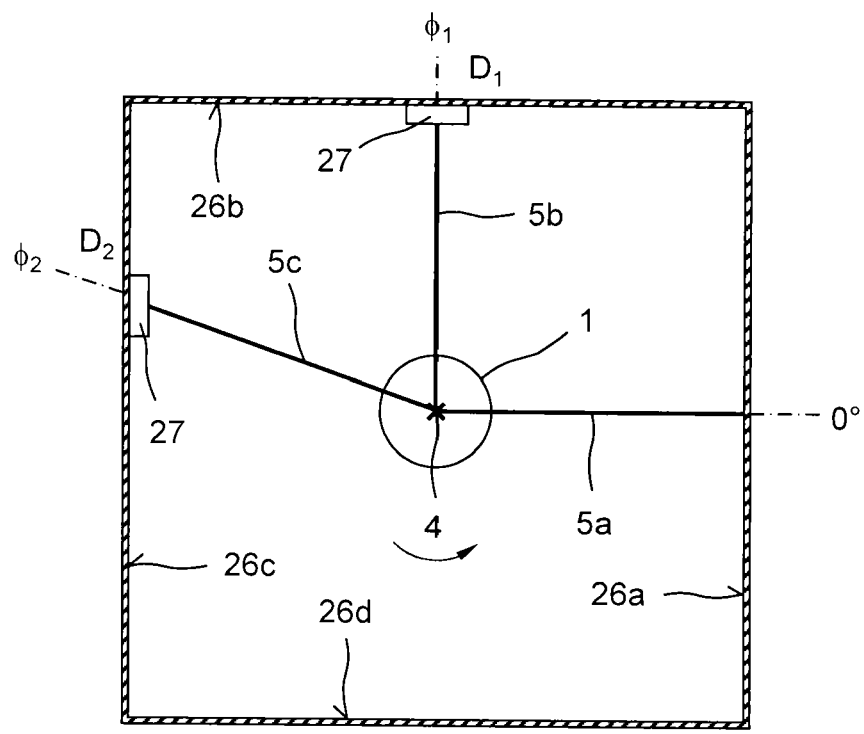
FIGS. 4A-C illustrate an arrangement made up of the rotary laser device from FIG. 1 and a laser receiver for measuring an angle between two points (FIG. 4A), the interaction of the rotary laser device and of the laser receiver in the form of a block diagram (FIG. 4B) as well as a method according to the invention for measuring an angle between two points (FIG. 4C).

FIG. 4A shows another application of the rotary laser device 1 and the laser receiver 27. The rotary laser device 1 and the laser receiver 27 may be used to measure angles between a first point $D_1$ and a second point $D_2$.

The rotary laser device 1 is arranged in a closed room and, in rotation mode, generates a continuous laser marking on the target surfaces 26a, 26b, 26c, 26d, which represent the four walls of the closed room. The first point $D_1$, which is arranged on the target surface 26b, corresponds to a first angular position $\phi_1$ and the second point $D_2$, which is arranged on the target surface 26c, corresponds to a second angular position $\phi_2$. The first and second points $D_1$, $D_2$ are determined by the position of the laser receiver 27.

Figure 4B:
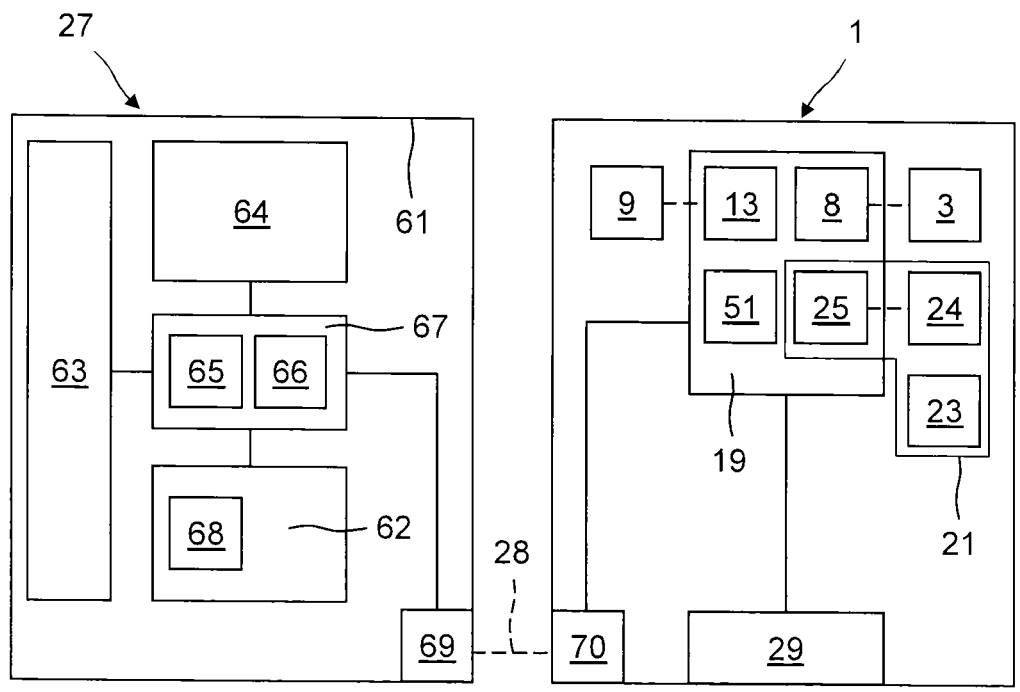

FIG. 4B shows the essential components of the laser receiver 27 and the interaction of the laser receiver 27 with the rotary laser device 1 in the form of a block diagram.

The laser receiver 27 includes a housing 61, into which an operating device 62, a detector device 63 for detecting the laser beam 5 and a display device 64 are integrated. The detector device 63 and the display device 64 are connected to an evaluation device 65. The evaluation device 65 is connected to a control device 66 for controlling the laser receiver 27, wherein the evaluation and control devices 65, 66 are integrated into a control unit 67 designed, for example, as a microcontroller. The laser receiver 27 can be switched between various operating modes via a mode switch 68.

The communication between the laser receiver 27 and the rotary laser device 1 takes place via the communication link 28, which connects a first transmitter/receiver unit 69 in the laser receiver 27 to a second transmitter/receiver unit 70 in the rotary laser device 1.

Figure 4C:
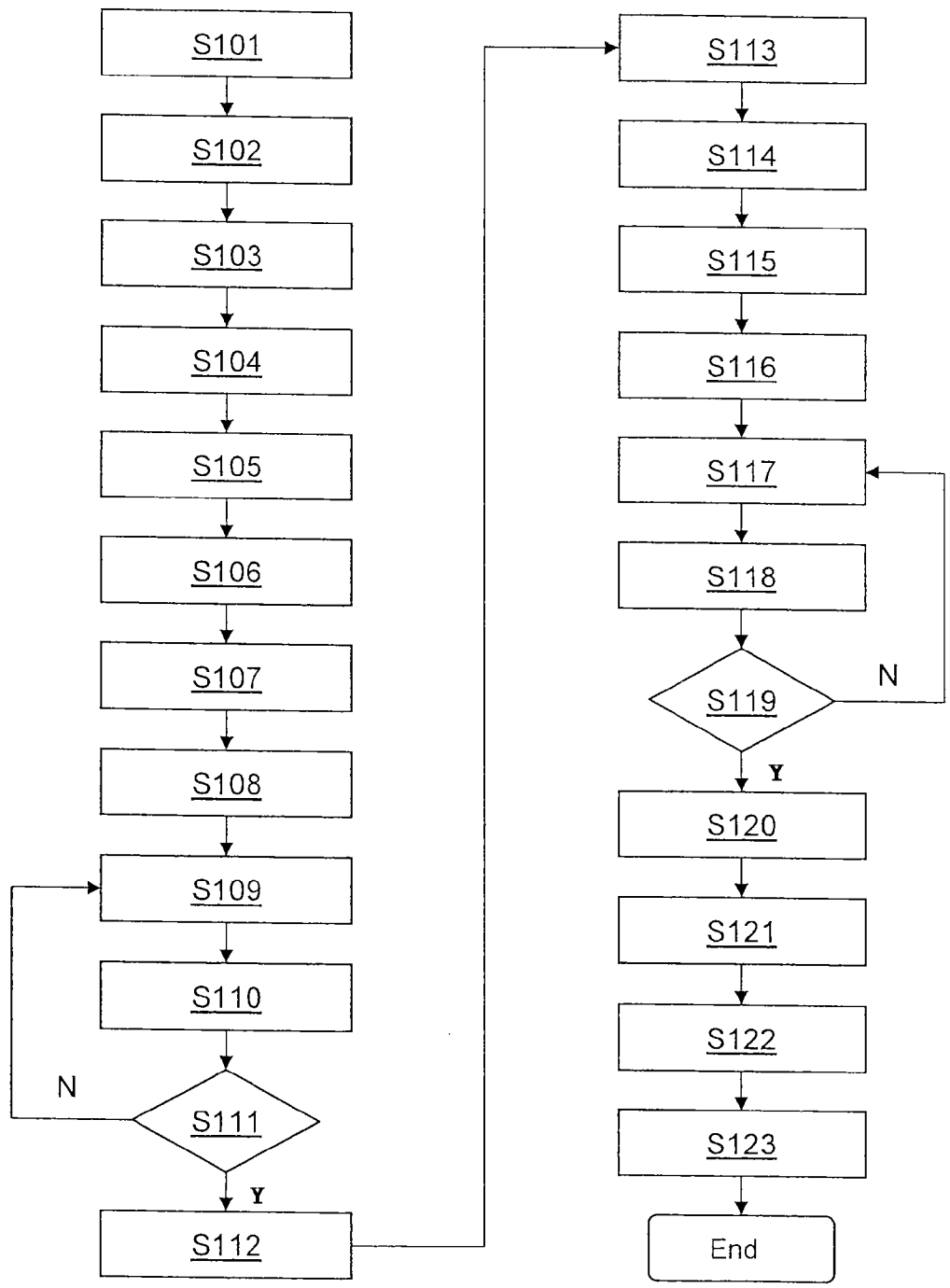

FIG. 4C shows method according to the invention for measuring an angle between the first and second points $D_1$, $D_2$ with the aid of the rotary laser device 1 and of the laser receiver 27.

In a step S101, the operator activates the angle measuring mode via the operating device 62 of the laser receiver 27. In a step S102, the communication link 28 between the laser receiver 27 and the rotary laser device 1 is activated. In a step S103, the control device 66 of the laser receiver 27 transmits a control command to the rotary laser device 1 to generate a continuous laser marking on the target surface 26. A rotating laser beam is generated in a step S104. In a step S105, the scanning device 24 detects the zero element 36 and transmits this information to the evaluation and control device 25 of the measuring device 21.

In a step S106, the operator is prompted to position the laser receiver 27 at the first point $D_1$. The operator positions the laser receiver 27 at the first point $D_1$ in a step S107 and confirms via the operating device that the laser receiver 27 has been positioned.

In a step S108, the evaluation and control device 25 issues a control command to the scanning device 24 to detect the angle of rotation. Detecting the angle of rotation begins at the angle of rotation of 0°, which is determined by the position of the zero element 36 in the reference track 35. When the increments 32, 33 change from a light strip 32 to a dark strip 33 or vice versa, the scanning device 24 generates an electric signal in a step S109, which is transmitted to the evaluation and control device 25 of the measuring device 21. In a step S110, the evaluation and control device 25 determines the momentary angle of rotation of the laser beam 5.

In a step S111, the evaluation and control device 25 queries whether the detector device 63 of the laser receiver 27 has received a laser beam 5. If the detector device 63 has not received a laser beam (N in 111), the method continues with step S109. If the detector device 63 has received a laser beam 5 (Y in S111), the momentary angle of rotation is saved in a step S112 in the memory device 51 as the first angular position by the evaluation and control device 25 and detecting the angle of rotation by the scanning device 24 is interrupted or terminated in a step S113.

In a step S114, the operator is prompted to position the laser receiver 27 at the second point $D_2$. In a step S115, the operator positions the laser receiver 27 at the second point $D_2$ and confirms via the operating device that the laser receiver 27 has been positioned.

The method is continued with the steps S116, S117 and S118, which correspond to steps S108, S109 and S110. In a step S119, the control device asks whether the detector device 63 of the laser receiver 27 has received a laser beam 5. If the detector device 63 has not received a laser beam (N in S119), the method continues with step S117. If the detector device 63 has received a laser beam 5 (Y in S119), the momentary angle of rotation is saved in a step S120 in the memory device 51 as the second angular position $\phi_2$ by the evaluation and control device 25.

In a step S121, the evaluation and control device 25 calculates the angle between the first point $D_1$ and the second point $D_2$ as the difference between the saved angular positions $\phi_2 - \phi_1$ and in a step S122, transmits the calculated angle $\phi_2 - \phi_1$ to the display device 64 of the laser receiver 27. In a step S123, the angle $\phi_2 - \phi_1$ is displayed for the operator on the display device 64 of the laser receiver 27. The method is concluded after step S123.

Alternatively, the operator may measure the angles with the aid of two laser receivers 27, which are positioned at the first and second points $D_1$, $D_2$. In this case, step S113 is omitted.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotary laser device, comprising:
   a laser device, wherein a laser beam is generatable by the laser device;
   a rotating device, wherein the laser device is movable by the rotating device around an axis of rotation at a rotation speed;
   a measuring device, wherein an angle of rotation of the laser device around the axis of rotation is determinable by the measuring device; and
   a memory device, wherein an angular position of the laser device is storable in the memory device.

2. The rotary laser device according to claim 1, further comprising a control device, wherein a beam property of the laser beam is adjustable as a function of the angle of rotation by the control device.

3. The rotary laser device according to claim 1, wherein the memory device is a mechanical memory device that includes a reference element on a master disk of the measuring device.

4. The rotary laser device according to claim 3, wherein the reference element is a reference track on the master disk.

5. The rotary laser device according to claim 1, wherein the memory device is an electronic memory device.

6. The rotary laser device according to claim 5, further comprising an input device and wherein the memory device is connected to the input device.

7. The rotary laser device according to claim 1 in combination with a laser receiver, wherein the laser receiver is connectable to the rotary laser device via a communication link.

8. A method for controlling a laser beam, comprising the steps of:
   moving a laser device by a rotating device around an axis of rotation at a rotation speed;
   detecting an angle of rotation of the laser device or of the laser beam around the axis of rotation by a measuring device;
   saving an angular position of the laser device in a memory device; and
   adjusting a beam property of the laser beam as a function of the angle of rotation.

9. The method according to claim 8, wherein the beam property is a laser power and/or an optical frequency and/or an amplitude.

10. The method according to claim 8, further comprising the steps of:
    saving a first and a second angular position in the memory device;
    changing a beam property of the laser beam from a first value to a second value when the first angular position is reached; and
    changing the second value to the first value when the second angular position is reached.

11. The method according to claim 10, further comprising the steps of:
    calculating a first angle of rotation and a second angle of rotation from the saved angular position;
    changing a beam property of the laser beam from the first value to the second value when a first angle of rotation is reached and from the second value to the first value when a second angle of rotation is reached.

12. The method according to claim 8, wherein a momentary angle of rotation of the laser device or of the laser beam is saved in the memory device as the angular position when the laser beam strikes a detector device of a laser receiver.

13. The method according to claim 12, further comprising the steps of:
    positioning the laser receiver at a first point and saving the angular position in the memory device as a first angular position; and
    subsequently positioning the laser receiver at a second point and saving the angular position in the memory device as a second angular position.

14. The method according to claim 13, further comprising the step of determining an angle between the first point and the second point by a difference between the first and second saved angular positions.

* * * * *